US006798912B2

(12) United States Patent
Devara

(10) Patent No.: US 6,798,912 B2
(45) Date of Patent: Sep. 28, 2004

(54) APPARATUS AND METHOD OF PROGRAM CLASSIFICATION BASED ON SYNTAX OF TRANSCRIPT INFORMATION

(75) Inventor: Kavitha Devara, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 553 days.

(21) Appl. No.: 09/739,501

(22) Filed: Dec. 18, 2000

(65) Prior Publication Data

US 2002/0076112 A1 Jun. 20, 2002

(51) Int. Cl.⁷ .................................................. G06K 9/72
(52) U.S. Cl. ....................... 382/229; 382/218; 382/224
(58) Field of Search ................................ 382/159, 176, 382/177, 181, 209, 218, 224, 229; 704/9; 707/1–10, 104.1

(56) References Cited

U.S. PATENT DOCUMENTS

| 5,371,807 A | | 12/1994 | Register et al. ............ 382/159 |
| 5,721,938 A | * | 2/1998 | Stuckey ......................... 704/4 |
| 5,742,827 A | * | 4/1998 | Ohkubo et al. ............ 717/143 |
| 5,835,667 A | | 11/1998 | Wactlar et al. ................ 386/96 |
| 6,038,527 A | * | 3/2000 | Renz ............................. 704/9 |
| 6,137,911 A | * | 10/2000 | Zhilyaev ..................... 382/225 |
| 6,192,360 B1 | * | 2/2001 | Dumais et al. ................ 707/6 |
| 6,424,971 B1 | * | 7/2002 | Kreulen et al. ................ 707/7 |
| 6,457,010 B1 | * | 9/2002 | Eldering et al. ............. 707/10 |

FOREIGN PATENT DOCUMENTS

| EP | 0648054 A2 | 4/1995 |
| EP | 0780777 A1 | 6/1997 |
| EP | 0794670 A2 | 9/1997 |
| WO | 9827497 A1 | 6/1998 |
| WO | 9941684 A1 | 8/1999 |

OTHER PUBLICATIONS

Qi, et al. "Integrating Visual, Audio, and Text Analysis for News Video", IEEE, Sep. 2000, pp. 520–523.*
Ariki, et al., "Indexing and classification of TV News articles based on telop recognition", IEEE, 1997, pp. 422–427.*
Srihari "Automatic indexing and content–based retrieval of captioned photographs", IEEE, 1995, pp. 1165–1167.*
"Semantic Analysis for Video Contents Extraction Spotting by Association in News Video", by Y. Nakamura et al., Institute of Information Sciences and Electronics, pp. 393–401. XP–002243708.
PHA 23,832, U.S. Ser. No. 09/441,943, filed: Nov. 17, 1999.
PHA 23,839, U.S. Ser. No. 09/441,949, filed: Nov. 17, 1999.

\* cited by examiner

*Primary Examiner*—Daniel Mariam
(74) *Attorney, Agent, or Firm*—Laurie E. Gathman

(57) ABSTRACT

A method of program classification based on syntax of transcript information includes receiving transcript information associated with the program wherein the transcript information has a plurality of sentences, determining characteristics of at least one of the plurality of sentences of the transcript information to identify at least the type and subject of the sentence, comparing the characteristics of the at least one of the plurality of sentences with a list of sentence characteristics having associated therewith a plurality of program types, and based on the comparing step, selecting a classification of program which is most closely associated with the characteristics of the at least one of the plurality of sentences.

20 Claims, 1 Drawing Sheet

APPARATUS AND METHOD OF PROGRAM CLASSIFICATION BASED ON SYNTAX OF TRANSCRIPT INFORMATION

BACKGROUND OF THE INVENTION

1. Field of the Invention

The present invention is directed to the classification of programs, and more specifically to the classification of programs based on syntax present in transcript information.

2. Description of the Related Art

Television program classification is known and is used in many apparatus and methods which analyze television broadcast signals. Traditionally, the classification of a program is determined by electronic programming guide (EPG) data included with the television broadcast signal. However, when the EPG data is not available or is not included with the television broadcast signal, the classification of the program cannot be readily identified.

OBJECTS AND SUMMARY OF THE INVENTION

It is therefore an object of the present invention to provide an apparatus and method which classifies the type of program based on transcript information.

It is another object of the present invention to provide an apparatus and method which classifies a program based on the syntax of transcript information.

It is a further object of the present invention to provide an apparatus and method for classifying a program which overcomes inherent disadvantages of known program classification methods.

In accordance with one form of the present invention, a method of classifying a program based on syntax of transcript information includes receiving transcript information associated with the program wherein the transcript information includes a plurality of sentences, determining characteristics of at least one of the plurality of sentences of the transcript information, comparing the characteristics of the at least one of the plurality of sentences with a list of sentence characteristics having associated therewith a plurality of program types, and based on the comparing step, selecting a classification of program which is most closely associated with the characteristics of the at least one of the plurality of sentences.

The above and other objects, features and advantages of the present invention will become readily apparent from the following detailed description thereof, which is to be read in connection with the accompanying drawings.

DETAILED DESCRIPTION OF THE PREFERRED EMBODIMENTS

Figure 1:
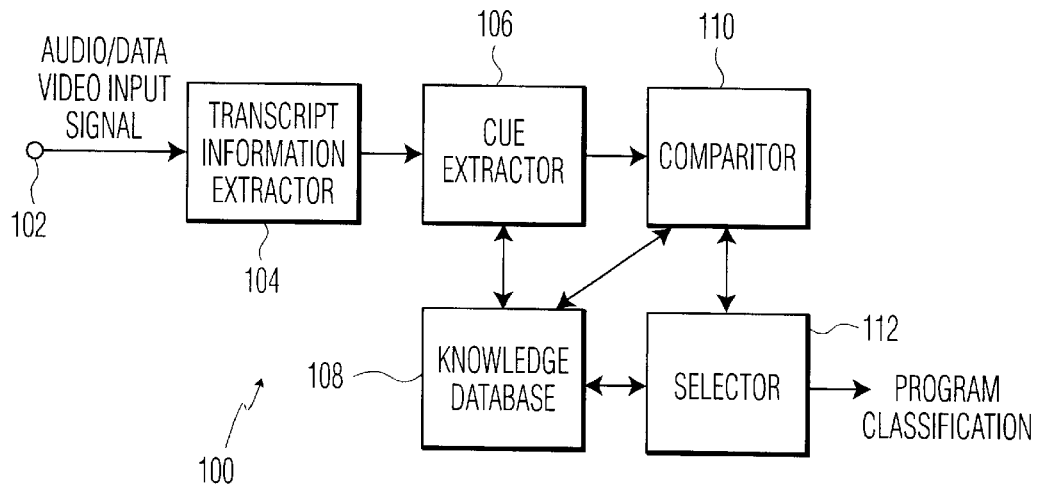
FIG. 1 is a block diagram of the apparatus for program classification based on syntax of transcript information according to the present invention.

Referring now to FIG. 1 of the drawings, a preferred embodiment of the apparatus of the present invention will now be described. The apparatus 100 includes a video input port 102 for receiving an audio/data/video signal which preferably includes transcript information. Coupled to the video input port 102 is a transcript information extractor 104 which extracts the transcript information from the audio/data/video input signal. If the audio/data/video input signal does not include transcript information (e.g. closed-captioned text), then the transcript information can be generated using known speech-to-text generation techniques (or obtained from a third party source). Once the transcript information portion of the input signal is extracted, it is provided to a cue extractor 106 for analysis.

The cue extractor 106 is coupled to a knowledge database 108 which contains a plurality of sets of cues, each set of cues being relevant to a particular classification type of program. The cue extractor monitors the transcript information for the occurrence of the syntax cues present in the knowledge database. The cues generally relate to the type of sentences (interrogative, exclamatory, imperative, declarative), and other sentence characteristics (first person, second person or third person). A comparitor 110 then compares the cues identified by the cue extractor with the information contained in the knowledge database to see which program type has the sentence characteristic identified by the cue extractor. Once a predetermined time period for analysis of the transcript information has lapsed, a comparison is made by a selector 112 to see which program type has the most matches to the cues extracted from the transcript information. The program type which has the most cues identified is selected by the selector as the program classification and the result is output.

Figure 2:
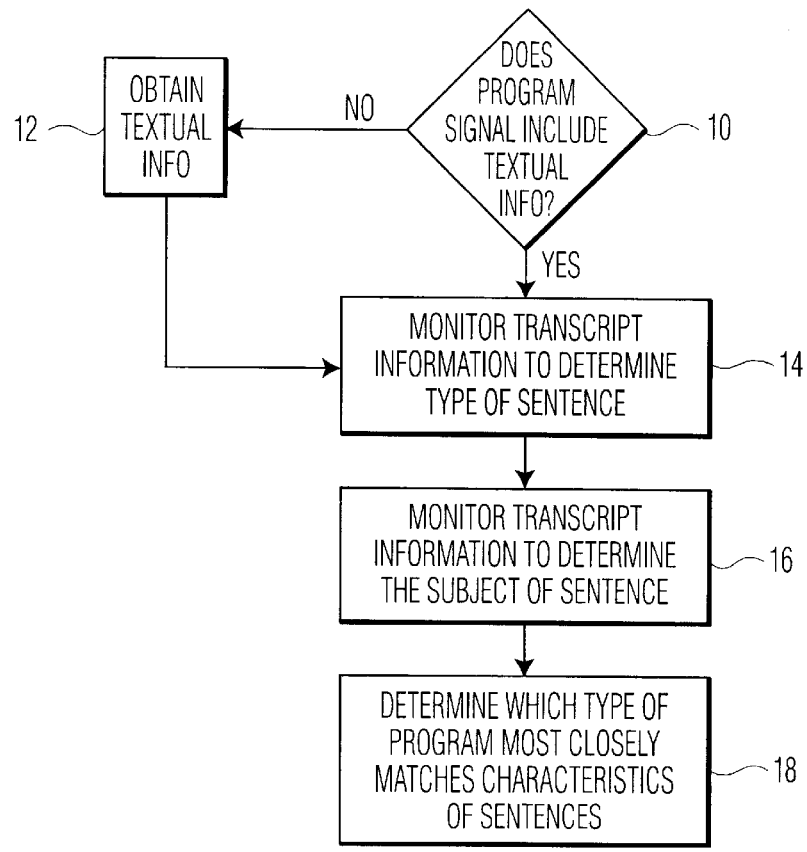
FIG. 2 is a flow diagram of the method for program classification based on syntax of transcript information in accordance with the present invention.

The method for program classification based on syntax of transcript information is shown in FIG. 2. The term transcript information is intended to indicate text, for example, closed-captioned text, which is to be provided with a video (televison) program's transmission (audio/data/video) signal and which corresponds to the spoken and non-spoken events of the video program, or other textual information like EPG data. The transcript information can be obtained from video text or screen text (e.g., by detecting the subtitles of the video) and applying optical character recognition (OCR) on the extracted text such as that discussed in U.S. Ser. No. 09/441,943 entitled "Video Stream Classification Symbol Isolation Method and System" filed Nov. 17, 1999 (now U.S. Pat. No. 6,614,930), and U.S. Ser. No. 09/441,949 entitled "Symbol Classification with Shape Features Applied to a Neural Network" filed Nov. 17, 1999 (now U.S. Pat. No. 6,731,788), the entire disclosures of which are incorporated herein by reference. If the audio/data/video signal does not include a text portion, (i.e., it does not include transcript information) transcript information can be generated using known techniques such as a speech-to-text conversion as known in the art. The transcript information could also be obtained from a third party source, for example, TV Guide via the internet.

The present invention is based on the knowledge that the transcript information associated with a program can be analyzed and searched using known searching techniques such as key-word searching and statistical text indexing and retrieval. Generally, the method includes analyzing the sentences of the transcript information to determine for each sentence, the type of sentence and the subject of each sentence, in essence, the grammatical structure of the sentence. Based on this information and the known tendencies of specific types of programs to have particular types of sentences and particular subjects, objects and a particular form of speech in each sentence (such information being stored in the knowledge database), a determination is made as to the classification (type) of program.

The method includes determining whether the broadcast signal corresponding to the program includes transcript information (Step 10). If the broadcast signal does not include transcript information (NO in Step 10), the transcript information can be generated using known techniques as mentioned above, or it can be obtained from a third party source (Step 12).

Once the transcript information has been obtained, the transcript information is analyzed using known natural language processing methods such as key-word searching and statistical text indexing and retrieval to categorize the sentences of the transcript information (as explained in more detail below). It is important to note that every sentence of a particular program need not be analyzed in order to classify the type of program. It has been found that an analysis of 30 seconds of transcript information (or about 5–10 sentences) is sufficient to provide a relatively high degree of accuracy in classifying the type of program. It should also be noted that the analysis of the textual information need not start at the beginning of the program, but could start at any portion of the program.

In the preferred embodiment, the transcript information is monitored to determine the type of sentence (e.g., declarative, interrogative, imperative and exclamatory) (Step 14) and the subject of each sentence (e.g., first person, second person, or third person) (Step 16). The type of sentence and subject of the sentence are determined using well-known methods/modules in natural language processing such as context-free and context-sensitive grammars.

The information regarding the type of sentence and subject of sentence is compared to information stored in a database (Step 18) (knowledge database). The database includes a list of types of programs (e.g., talk show, news program, sitcom, etc.) and the corresponding known characteristics of the sentences for each program. The type of program which most closely matches the characteristics of the majority of the sentences that were analyzed is selected as the classification of program. An example of some of the typical sentence characteristics of programs which are stored in the database with which the categorized sentences are compared includes:

Sitcom: first/second person subjects, interrogative sentences, exclamatory sentences, additional footnotes in transcript text like doorbell, laughing, cheers, and applause;

News Program: Third person sentences, many sentences start with "The". The form of speech is typically indirect/reported. Not many colloquial expressions.

Interview: Most of the sentences start with "You". The sentences are usually "dialogue based".

It is also foreseen that not only are the type of sentence and subject of each sentence determined, but also additional footnotes in the transcript information which typically identify non-verbal sounds are analyzed to classify the program. These additional non-verbal notes include, for example, doorbells, knocking, laughter, giggles, cheers and applause.

While only situational comedies, news programs and interview-type programs have been mentioned above, it is foreseen that any type of program, e.g., sports, theater, speech, etc. could be identified if the syntax cues are present in the database.

Having described specific preferred embodiments of the invention with reference to the accompanying drawings, it will be appreciated that the present invention is not limited to those precise embodiments and that various changes and modifications can be affected therein by one of ordinary skill in the art without departing from the scope or spirit of the invention defined by the appended claims. For example, while the present invention is described in the context of its use with television broadcast signals, it is foreseen that the system can be utilized with audio processors (i.e., radios), computers that have internet accessibility so as to scan internet-based signals, or any stored content to create textual information which can be searched and processed in accordance with the present invention.

What is claimed is:

1. A method of classifying a program solely based on syntax of transcript information comprising the steps of:

receiving transcript information associated with the program, the transcript information including a plurality of sentences;

determining sentence characteristics of at least one of the plurality of sentences of the transcript information;

comparing the sentence characteristics of the at least one of the plurality of sentences with a list of sentence characteristics having associated therewith a plurality of program types; and based solely on the step of comparing sentence characteristics, selecting a classification of program which is most closely associated with the sentence characteristics of the at least one of the plurality of sentences.

2. The method of classifying a program according to claim 1, wherein the sentence characteristics comprise at least one of a type of sentence and a subject of sentence.

3. The method of classifying a program according to claim 2, wherein the type of sentence is one of declarative, interrogative, imperative and exclamatory, and wherein the subject of the sentence is one of first person, second person and third person.

4. The method of classifying a program according to claim 1, wherein the classification of the program is one of news program, interview and situational comedy.

5. The method of classifying a program according to claim 1, wherein the determining step comprises natural language processing.

6. The method of classifying a program according to claim 1, wherein the transcript information comprises closed-captioned text.

7. The method of classifying a program according to claim 1, wherein the step of determining sentence characteristics of at least one of the plurality of sentences of the transcript information further comprises the step of:

determining a sentence characteristic based on a content of at least one footnote in the transcript information.

8. The method of classifying a program according to claim 7, wherein the content of at least one footnote in the transcript information comprises non-verbal sounds.

9. The method of classifying a program according to claim 1 further comprising the step of:

selecting the classification of program after analyzing thirty seconds of the transcript.

10. The method of classifying a program according to claim 1 further comprising the step of:

beginning an analysis of the transcript at a portion of the transcript that is not the beginning of the transcript.

11. Apparatus for classifying a program solely based on syntax of transcript information comprising:

a transcript information extractor for receiving transcript information associated with the program, the transcript information including a plurality of sentences;

a cue extractor for determining sentence characteristics of at least one of the plurality of sentences of the transcript information;

a comparitor for comparing the sentence characteristics of the at least one of the plurality of sentences with a list of sentence characteristics having associated therewith a plurality of program types stored in a knowledge database; and a selector for, based solely on the comparison of sentence characteristics, selecting a classification of program which is most closely associated with the sentence characteristics of the at least one of the plurality of sentences.

12. Apparatus for classifying a program according to claim 11, wherein the sentence characteristics comprise at least one of a type of sentence and a subject of sentence.

13. Apparatus for classifying a program according to claim 12, wherein the type of sentence is one of declarative, interrogative, imperative and exclamatory, and wherein the subject of the sentence is one of first person, second person and third person.

14. Apparatus for classifying a program according to claim 11, wherein the classification of the program is one of news program, interview and situational comedy.

15. Apparatus for classifying a program according to claim 11, wherein the determining performed by the cue extractor comprises natural language processing.

16. Apparatus for classifying a program according to claim 11, wherein the transcript information comprises closed-captioned text.

17. Apparatus for classifying a program according to claim 7, wherein the determination of a sentence characteristic is based on a content of at least one footnote in the transcript information.

18. Apparatus for classifying a program according to claim 17, wherein the content of at least one footnote in the transcript information comprises non-verbal sounds.

19. Apparatus for classifying a program according to claim 7 wherein the classification of program is selected alter analyzing thirty seconds of the transcript.

20. Apparatus for classifying a program according to claim 7 wherein an analysis of the transcript is begun at a portion of the transcript that is not the beginning of the transcript.

* * * * *